April 18, 1933.   J. A. COOMBS   1,904,916
ACTIVATED SLUDGE PROCESS OF SEWAGE AND OTHER IMPURE LIQUID PURIFICATION
Filed Oct. 24, 1927   5 Sheets-Sheet 1
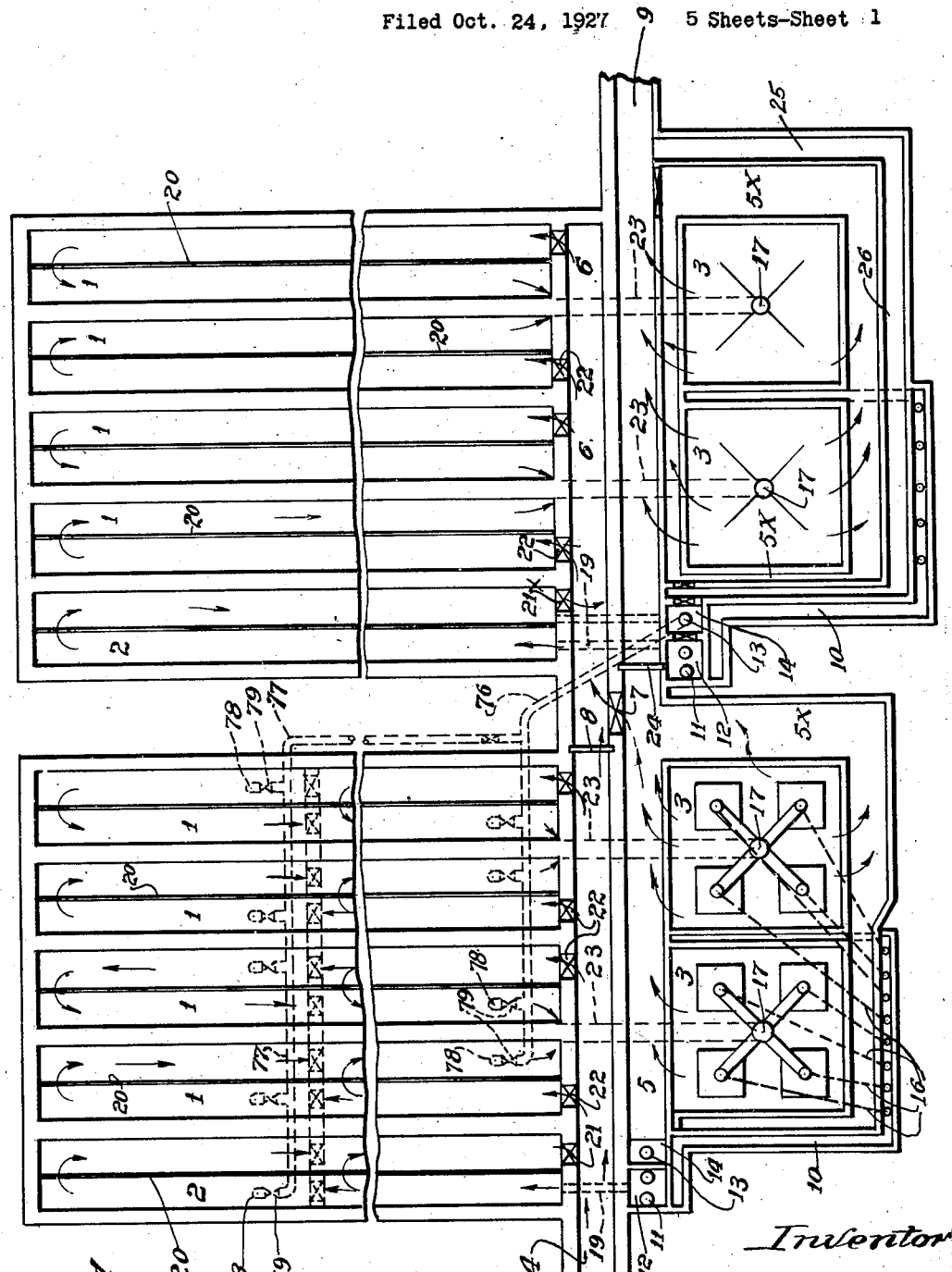
Inventor
James Alger Coombs
By: Williams, Bradbury,
McCaleb & Hinkle
Attorneys

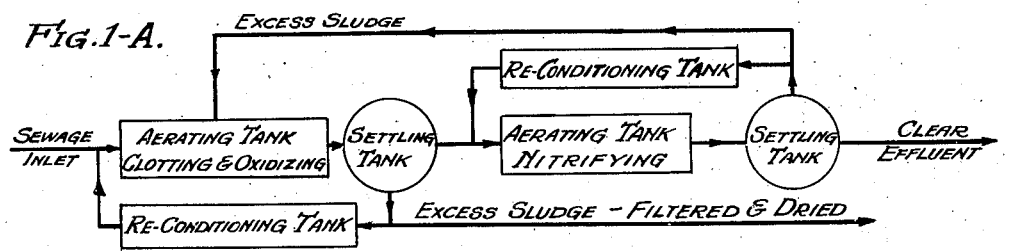
Fig. 1-A.
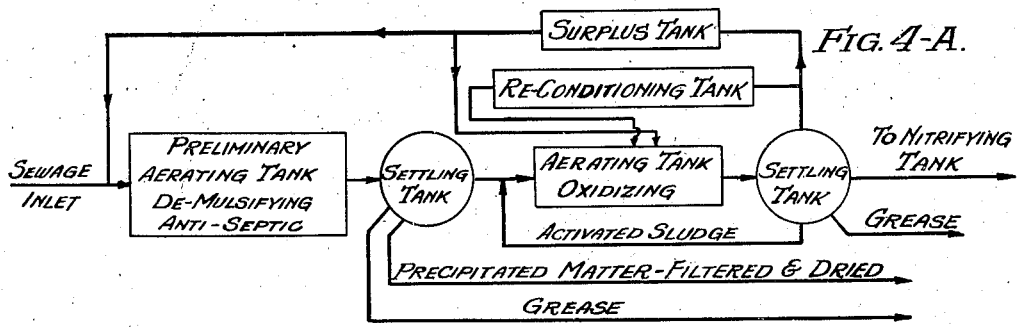
Fig. 4-A.
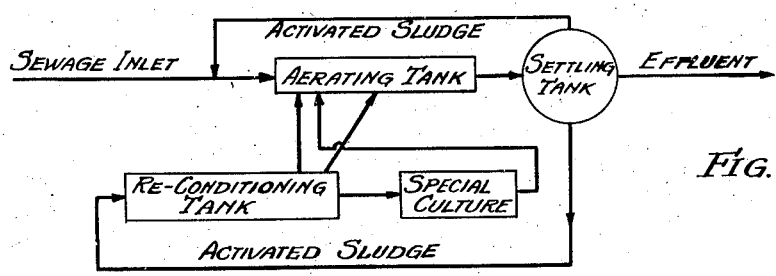
Fig. 5-A.
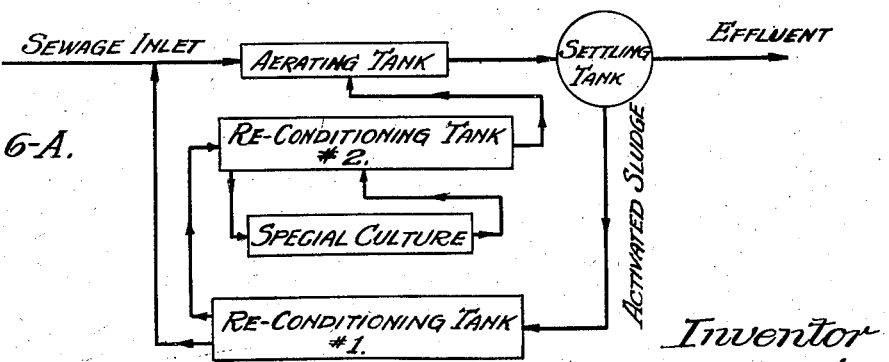
Fig. 6-A.

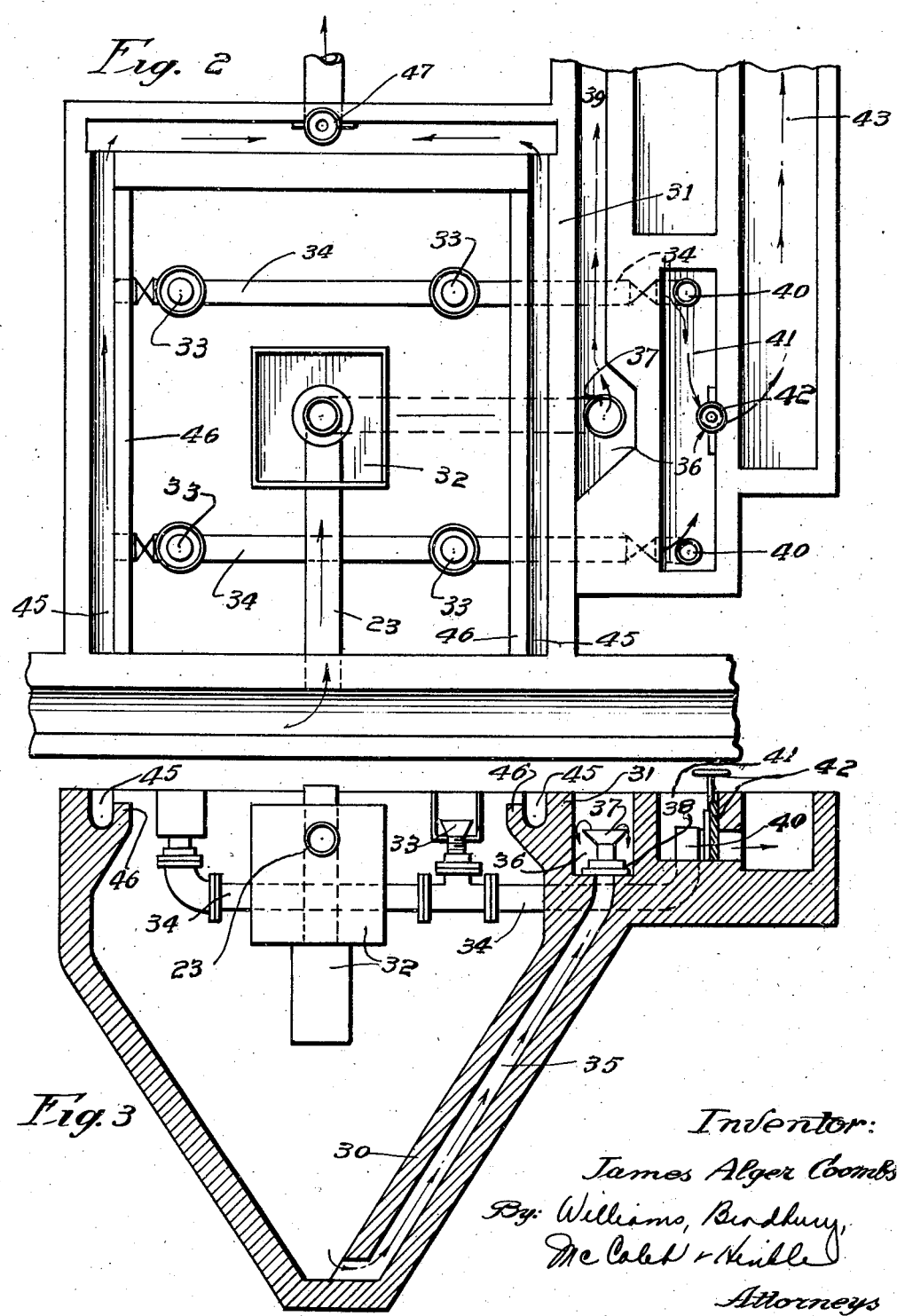

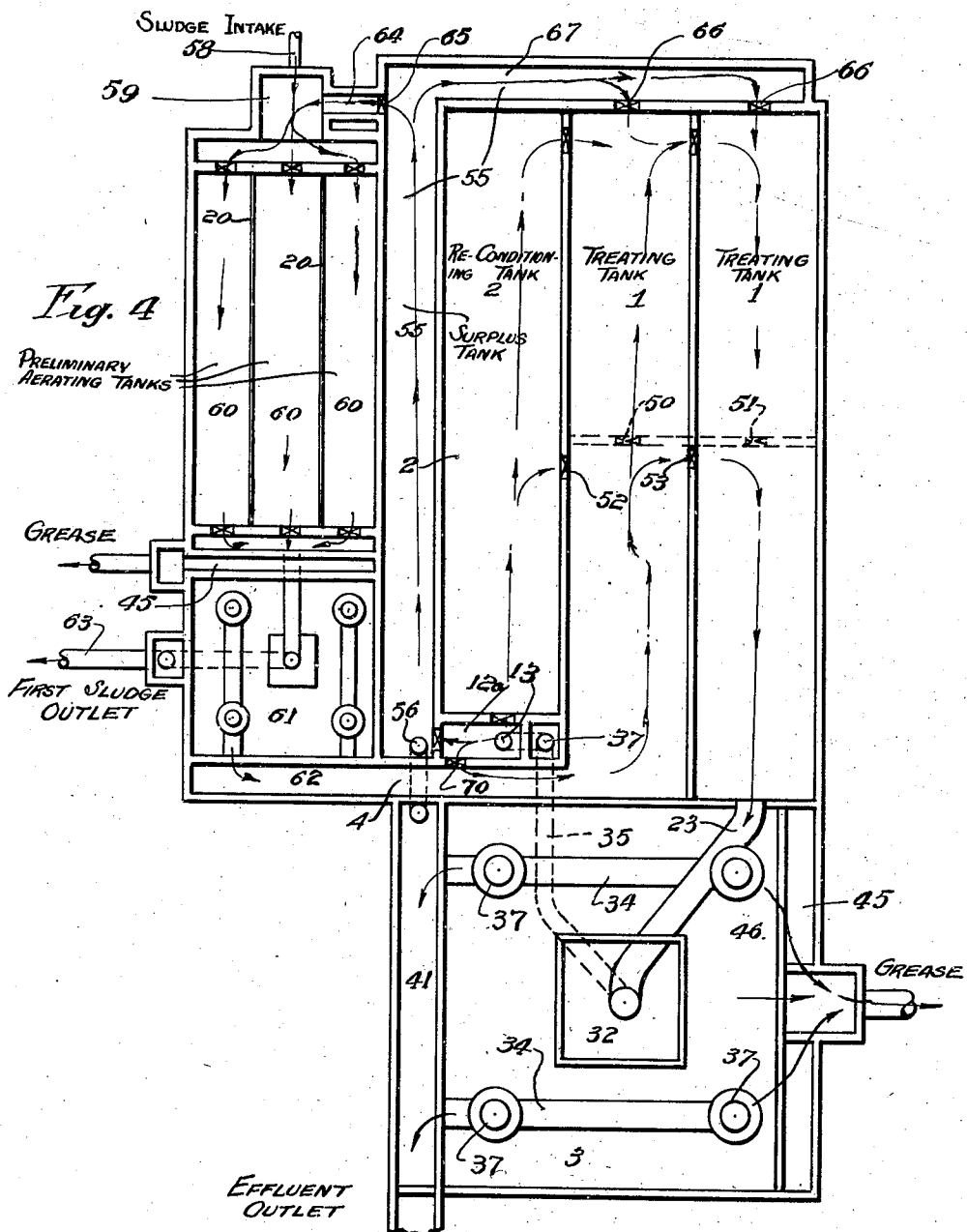

April 18, 1933. J. A. COOMBS 1,904,916
ACTIVATED SLUDGE PROCESS OF SEWAGE AND OTHER IMPURE LIQUID PURIFICATION
Filed Oct. 24, 1927 5 Sheets-Sheet 5
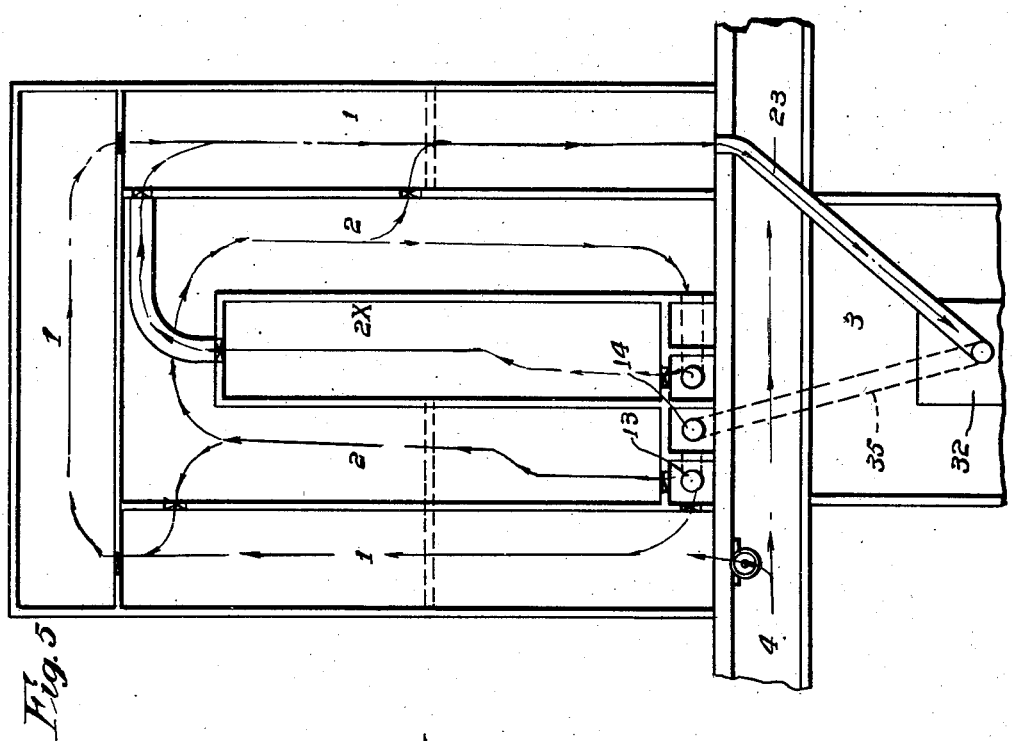
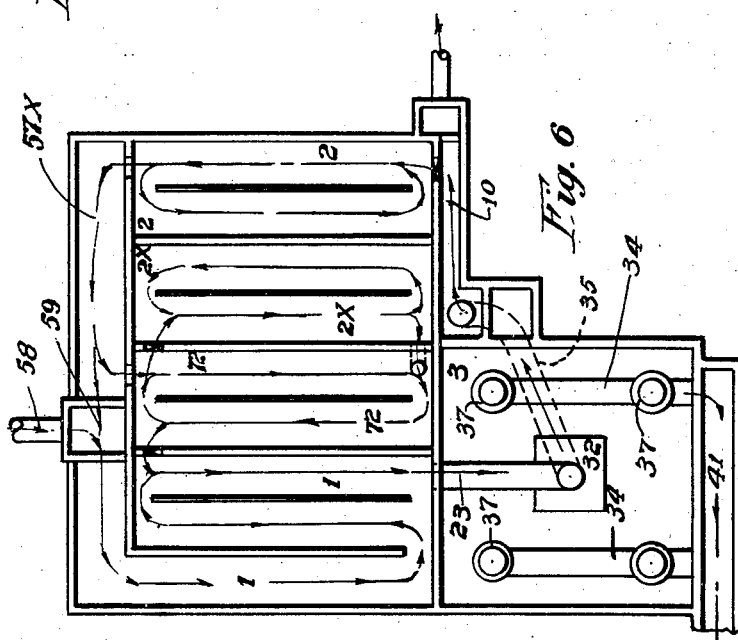

UNITED STATES PATENT OFFICE

JAMES ALGER COOMBS, OF LONDON, ENGLAND, ASSIGNOR TO ACTIVATED SLUDGE, INC., OF CHICAGO, ILLINOIS, A CORPORATION OF DELAWARE

ACTIVATED SLUDGE PROCESS OF SEWAGE AND OTHER IMPURE LIQUID PURIFICATION

Application filed October 24, 1927, Serial No. 228,323, and in Great Britain October 27, 1926.

This invention has reference to the species of process and plant for the purification of sewage and other impure liquids known as "The activated sludge process", wherein the liquid is acted upon by air and bacterial sludge, this sludge being a bacterial cultivation held and contained in sludge produced by the process, and resulting from the breaking down of the impure matters, together with the action of air, which may be introduced to it by forcing it through the liquid being treated in a diffused state, or by surface contact and agitation, or by equivalent methods.

In treating some kinds of sewage or similar impure liquids by this process, that is sewage commonly called "strong sewage", and/or sewage containing trade wastes, or medium strong sewage, it has been found that the polluting contents of the sewage water as it flows through the treating tank or tanks, so act upon the bacteria or other organisms, and particularly the nitrifying organisms that they are rendered for a time inactive and inefficient, owing largely to the presence in the inflowing crude or untreated sewage of quantities of organic matter, and in consequence the full purification, including the oxidation of all the nitrogenous matters or ammonium compounds to nitrates and nitrites, takes an inordinate length of time, which would render the size of plant necessary to deal with a given quantity of sewage and purify it to the degree necessary, very large and costly, and the power consumption for the compression of air, or the mechanical action on the liquid excessive, and in some cases so large as might render the process commercially not feasible.

One of the primary objects and effects of the present invention is to provide improvements in connection with this process by which these drawbacks or defects are deviated, so that the time taken to carry out the process to the full degree of purification required, is short. As for instance approaching a shorter time such as is required for dealing with and treating sewage or impure liquids of a weak kind. Other objects and effects of the invention are hereinafter mentioned in the following descriptions of the modes of carrying out the invention.

The defects or drawbacks referred to as to the time required for complete purification and nitrification, exist also in connection with the treating or dealing with normally weak sewage, where large quantities of trade waste may be intermittently discharged into the sewers and delivered to the plant; or in cases where there are variations of strength of the sewage both in dry and wet weather.

In the method of treatment or carrying out this invention, the following characteristics are involved or comprised:—

The sewage or liquid in its flow through the first or earlier portion of the purifying plant is treated only or primarily for the removal by clotting out and/or by oxidation of the carbonaceous or organic matters in it, and then subsequently it is treated for the purposes of further oxidation, and also nitrification of the ammonium compounds, in which nitrifying organisms are required and employed; and to the end, that this shall be accomplished in a relatively short time, and with a small plant, of the total sludge which is used in the treatment or process only a part is used in the first or earlier treating tank or tanks or part of the treating plant, and this part—with air—effects the removal by clotting out and/or by oxidation of the carbonaceous or organic matters in the liquid (but with the possible destruction or rendering inactive of nitrifying organisms it contains), and the other part (in which the nitrifying organisms are active and sufficient in quantity) is used in the later stages of the process. The purification or treatment is thus effected in stages or successive operations, and these may be carried out in two or more ways.

The liquid, consisting of sewage and sludge, after being acted upon or treated by a part of the sludge as stated, in the first or earlier tank or tanks of the plant, is in some cases settled in a settling tank, and the sludge removed and reconditioned or reaerated by air, and this part of the sludge, so reconditioned or reaerated, is returned to the first or earlier tank or tanks or part of the plant as stated, and used again, and so on.

Removal, either by coagulation of the colloidal matter and/or by oxidation of the carbonaceous or organic matter is chiefly accomplished in the first or earlier tank or tanks or portion of the plant; and nitrification chiefly takes place in the later portion.

The effluent from this settling tank is returned to the other or subsequent aerating or treating portion of the plant, and to it is supplied the other portion of the sludge which has not been in contact with sewage containing much organic matter, and this liquid after aeration and treatment is settled in a settling tank, and the separated sludge returned to this latter portion of the plant.

Grease is removed from the liquid in the settlement or separating tank in which the sludge is separated, so that the sludge used in the process, and the surplus sludge produced and not required in the process, and withdrawn from it, and carried away from the plant, is less greasy. In some cases the grease may be removed in the preliminary treating tank or tanks of the plant, or other suitable tanks.

In the case where sewage normally arrives at the treating plant or occasionally arrives in a septic state, the gases resulting from this condition are removed, and septic conditions are arrested; and the liquid is also generally conditioned, so that subsequent actions which take place in the treating or purifying tanks or portion of the plant, are facilitated or promoted, and rendered more effective and rapid. This is accomplished by agitating or treating the crude or raw sewage before treatment, and on its way to the clotting and biological portion of the treatment and plant, by air, preferably by forcing it through it; and this effect is in addition to the effect of disintegrating large particles of polluting matter which in some cases arrive at the plant in the sewage, and which require to be broken up.

This preliminary aeration of the sewage, (after it has been freed from grit and screened if carrying either grit, cloths, banana skins, or such like matters) as stated, betters its condition for the working upon it of the aerobic bacteria subsequently, and it demulsifies the grease and sets it free as specified; and in some cases, the surplus activated sludge from the subsequent treating plant may be mixed with the sewage before or during the preliminary aeration; but if surplus sludge is not available, pre-aeration may take place without any accumulation of sludge being added to the sewage.

After aeration in the preliminary tank, the aerated liquid passes into a settlement tank, which tank is fitted with means of grease collection, from which the grease passes away for disposal in any suitable manner.

The use of the surplus activated sludge from subsequent stages in the preliminary aeration tank will help to precipitate light matters held in suspension in the sewage, thus the effluent drawn off from this preliminary process will in addition to the effects of degreasing and conditioning, be further partly purified by the action of this surplus sludge, thus rendering the subsequent action of purification more efficient and shorter in the times required for purification.

In the operation of the activated sludge process, in cases where the sewage is strong, especially if it contains trade wastes—or even in cases of average strength of sewage, when the bacterial sludge comes in contact with the organic matters with which such sewage is contaminated, the effect, at least on the nitrifying organisms contained in the sludge, is that they are either rendered inactive or weakened, or possibly to a large extent killed; and it is found in the activated sludge process as hitherto practiced, the purification up to the degree of purity more commonly required, not infrequently requires much time—i. e. too much time, owing, we have found to the fact that the greater part of the oxidation of the ammonium compounds to nitrite or nitrate takes place chiefly in the later stages or portion of the flow of liquid through the plant, and that the life or activity of nitrifying organisms in the sludge is very much reduced, if not largely destroyed, by the presence in the sewage entering and in the early part of the treatment or process of organic matters which is inimical to the life or activity of these organisms, and one of the objects and effects of this invention is, as stated, to obviate these drawbacks or defects.

The following description gives one mode of carrying out the process according to this invention, in which the sludge contained and produced in the process is in part applied to the clotting out and/or oxidation of the carbonaceous or organic matters, and in part applied to the oxidation of ammonium compounds to nitrite and nitrate.

The crude sewage, that is sewage as it comes from the sewers—or after passing through screens and detritus or like tanks—is continuously supplied and passed through a tank in which it is subjected to the action of air, which may be forced through it, or introduced to it mechanically in any suitable way, which has the effect of stopping any septic action, and forcing out sewer gases, as well as promoting the condition of the liquid so that the separation of the insoluble solids, and the detritus or heavy insoluble matters in settling tanks, and also the separation of grease from the sewage, which it is desired to do, is facilitated. Subsequently to this treatment, and in the case of a continuous tank or tanks, at or near the point at which this preliminary air treatment terminates, a certain quantity of the bacterial sludge which has been re-activated or re-conditioned is passed into the tank, and mixed with the sewage, and the mixture is acted upon by air or aerated. In this operation, at first clotting of the colloids takes place, and then possibly the oxidation of a portion of the organic matter obtained from the liquid takes place; and then at the end of this tank and operation, the liquid is subjected to settlement in a settling and separating tank, wherein the bacterial sludge and insoluble matters and the like are deposited, and the effluent carried forward.

As stated above, only "a certain quantity" of sludge is added to the liquid in the early part of the air treatment of the sewage, the meaning of this being that a part only of the whole quantity of sludge existing and used in connection with the whole process and plant; and this portion may be half, or more or less than half of the whole sludge, and this sludge is re-aerated or re-conditioned in a tank or channel and re-used; while the part of the whole sludge used in the process which has not been used in this first tank and stage of treatment, is introduced at another and later stage of the purifying treatment. In this first stage or treatment the organic matters contained in the liquid are practically removed and later on destroyed by bacteria contained in the sludge, but the nitrifying organisms or bacteria contained in it will at the same time be very largely debilitated or rendered inactive, whereas in the part of the sludge which has not been used in the first stage treatment, the nitrifying organisms will exist in a fully active state, and this sludge is passed to and used in the subsequent stage or stages, and tanks of the process and plant for the purpose mainly of the oxidation of the ammonia compounds to nitrite and nitrate. After the treatment of the liquid by air in this second stage or part of the plant, it is again passed to a settling tank, viz., a tank used at the end of the second stage sewage and sludge treatment tank, and after re-aerating or reconditioning the sludge, it is returned to the part of the plant where the second stage treatment commences or takes place.

In some cases, as stated, in connection with the preliminary or/and first stage process or treatment tank, and its settling tank, a mode of and means for removing and withdrawing grease from the liquid is provided, in which case three liquids, sludge, grease and the effluent, are separated, and pass away from it, separately, as hereinafter described; and in accomplishing these separations, the discharge level of effluent from the tank is adapted to be varied automatically or mechanically by regulating the outflow therefrom, say by a valve, which when closed more or less, the restricted area for discharge will cause the level in the tank to rise, and by a trough or draw off device, the lip or inlet of which is above the normal level of liquid in the tank, when the level rises, the grease which will be floating on the liquid will be caused to pass away into this skimming device. When the liquid is free of grease, the level is again lowered, so that the top liquid then passes to the next tank of the plant, and first and/or second stage of sludge and air treatment; while the separated sludge is forced up from the bottom of the tank and delivered from it by gravity or air lift or pumping.

As a modification of the above method of removing grease from the liquid, it may be continuously swept off by hand operation or skimmed by automatic skimming means.

The greater part of the process of oxidation of the ammonium compounds to nitrite and nitrate, and further general oxidation of the liquid commences to take place after the inflow into the second stage tank of the effluent from the first stage tank, when the bulk of the organic matter has been removed, and as the re-conditioned sludge which is introduced into the mixed liquor in this stage will have its nitrifying organisms undiminished in strength, and of full activity as it has been in contact with only a small quantity of organic matters, the organisms act at once on the ammonium compounds, and continue to do so, and consequently the duration of the purifying treatment is proportionately reduced. The smaller the quantity of organic food present, the more rapidly will nitrification progress.

In some cases, there is used in connection with the plant special bacteria organism cultivation tanks or channels, in which sludge is contained, and aerated to a high degree for the special cultivation of nitrifying or other organisms, and this sludge may be used to inoculate or reinforce the bulk of sludge being used in the purifying treatment. The channels or tanks in which this cultivation is carried on may be specially designed for the purpose, and the sludge which is cultivated, may be that collected, and be part of the surplus sludge which is created in the activated sludge process, and which normally is taken away from the tank as surplus.

Other features of the invention are hereafter described in connection with the accompanying drawings.

The drawings hereto annexed give diagrammatic examples illustrating the different modified manners or methods of carrying out the invention, and also show the different arrangements and forms or constructions of the plant and tanks.

Figure 1 is a plan illustrating the method of and arrangement of plant in which the treatment and purification of sewage—say strong sewage—is effected, are carried out in two entirely separate stages, and sets of plant, namely, the stage consisting of the clotting out of the pollute or readily oxidizable matters during which coagulation of the colloidal matter held in the sewage takes place, and the pollute is transferred from the liquid to the sludge, and clarification of the sewage to a large extent is effected, the pollute being still held practically unoxidized in the sludge; while in the second stage and portion of the plant the conversion or oxidation of the ammonium compounds to nitrates and nitrites takes place.

In this figure there is also illustrated the method of impounding some of the sewage being treated.

Figures 2 and 3 are plan and section of a settling tank and parts connected with it adapted to enable grease and floating matter to be removed from the sewage, and also to enable the conduits connected with parts to be flushed and kept free of adhering deposit of sludge or matters, and otherwise control the fluids as hereinafter described to enable a proportional volume of flow of sewage and sludge to be obtained.

Figure 4 is a plan showing an example of a plant adapted to carry out the stage system above described and specified in connection with the plant shown in Figure 1, in a modified manner; and it also illustrates a manner of treating of the sewage to the action of air (from which detritus or grit or gross matters may have been previously removed), prior to its delivery into the treating or purifying plant proper, the treatment being thus a preliminary aerating one, to the main treatment.

In Figure 5 is shown a plant in which the cultivation of special bacterial organisms takes place, the resultant cultivation being used and applied to the treatment of the modified stage system specified in the description of the mode of carrying out the invention described in connection with the plant illustrated in Figure 4. Figure 6 is a plan showing a modified form of my plant.

This latter kind of plant can be advantageously applied to the treatment and purification of sewage of average strength or sewage of which the pollute is weak. Figures 1—A, 4—A, 5—A and 6—A illustrate graphically the processes described and adapted to be carried out by means of the apparatus shown in Figures 1, 4, 5 and 6 respectively.

Referring now to the arrangement of plant shown in Figure 1, this consists of a plurality of tanks, stage portion or section of the plant, all the tanks being in parallel.

Of the tanks 1 are the treating or purifying tanks proper, in which the sewage is aerated, and 2 is a sludge re-aeration or re-conditioning tank. 3 are settling tanks used in connection with each stage section for separating the sludge from the water; and 4 is the conduit by which the sewage is delivered to the plant; and it may be assumed the sewage delivered is free of grit and gross matters; and may in some cases—especially in cases where the sewage is on the strong side—have received the preliminary air treatment specified. 5 is a conduit connected with the first stage settling tanks 3, through which the effluent freed of sludge, passes away to the second stage plant section; and 6 is a conduit (being in line with or a continuation of the conduit 4) for distributing this partly treated and purified liquid to the treating tanks 1 of this section; the liquid passing from the conduits 5 to 6 being taken through a valved opening in the wall separating the conduits 5 and 6. A pen-stock 8 is normally placed across the conduits 4, 6, at a point in front of the opening 7, so that the conduits 4, 6, do not normally communicate.

9 is the final purified effluent conduit from the second stage settling tanks.

The conduits for conveying the sludge from the settling tanks in each case are designated 10; and 11 are air lifts for the sludge provided in the chambers or wells 12 for lifting the sludge to the required level, namely, to that which will cause it to flow into the re-aeration or re-conditioning tanks 2 of each stage plant, or where required.

13 is an air lift by which the quantity of sludge aerated in the treatment, and which is over and above the quantity required in the process, i. e. surplus sludge is delivered into the tank 14 in each section of plant and from which in the first stage it is carried off from the plant, while in the second stage it is generally returned to the end of the first stage or otherwise conserved.

The settling tanks may each be of the kind shown in the left hand side of the plant, having a plurality of conical bottom parts or hoppers, in which the sludge is deposited and from which it is carried off by pipes represented by the dotted lines 16 into the conduit 10; 17 being the pipes by which the mixed water and sludge from the different parts of the two sets of tanks 1 are delivered into the several sections of the settling tanks.

The conduits and parts represented by dotted lines shown in connection with left hand or first stage tanks, illustrate the impounding method or system and manipulating of the plant. This dotted work is hereinafter described in connection with the description of the impounding system.

The sludge from the first stage plant chamber 12 passes by a conduit 19 into the first sludge re-conditioning tank 2, in the flow or passage through which it is aerated; i. e. by air forced through it, or by surface air contact. The sludge passes to the outer end of this tank 2, and then back on the opposite side of a septum 20 into the sewage feed or supply conduit 4 through a valved opening 21; and from this conduit 4 the mixed sewage and re-conditioned sludge passes by valved openings 22 into the various tanks 1 of the first stage section. In the arrangement shown in Figure 1, the liquid and sludge from each adjacent pair of tanks 1 is carried away from same through conduits 23, into the distributing pipes 17 of the two settling tanks 3 used in connection with each stage plant section.

In the second stage plant, the sludge from the settling tanks passes similarly as in the first stage, from a chamber 12 by way of a conduit 19 into the tank 2, and after being reconditioned in it, it passes by a valved opening 21$x$ into the distributing conduit 6; and the mixed liquid and sludge passes by valved opening 22 into various tanks 1 of the second stage section. The liquid and sludge passes away from the treating tanks 1 by conduits 23 to the settling tanks 3 of this stage plant, similarly as described in connection with the first stage, and the final effluent of clear liquid from the plant passes away by the conduit 9. It will be seen that while the conduit 9 is a continuation of the conduit 5, it is normally cut off from it by a penstock 8 in it.

The settling tanks 3 of the second stage portion of the plant are different in some respects from those of the other portion; namely, between the conduits 5$x$ and 5, into which the effluent from the tank flows from the settling portions proper, there is an outer or extra conduit 25, which is separated from the inner conduit by a weir 26, which is at a different level to the corresponding one in the other tanks 3, and the effluent from the settling tanks passes into the channel 5$x$, but is prevented from passing into the channel 25 by a weir 26, which is of such a level that when the apparatus is used as a single stage process as hereafter described, the level of the liquid will be higher in the second part of the plant than when operating as a two stage process, and the effluent will overflow the weir 26 into the outer channel 25, and so into the channel 9.

The plant shown in Figure 1 is so constructed and adapted that it can be used as a single stage plant as ordinarily carried out; and should it be so desired, the openings 7 will be closed, and the pen-stocks 8 and 24 removed, so that the channels 4 and 6 will communicate, as would also the effluent channels 5 and 9.

By this process, during the first stage, the colloidal matter is caused to coagulate, and the pollute passes to the sludge, thus clarifying the sewage to a large extent, the pollute being held for a time practically unoxidized in the sludge; later the carbonaceous or organic matters are broken down, and oxidized to carbon dioxide; whilst in the second stage, the nitrogenous matters are oxidized to nitrite and nitrate, and thus the liquid undergoes a biological operation; and this oxidation of the nitrogenous compounds is slow and the more difficult, and only begins after the clotting or clarification stage is complete, and as in most cases a high degree of purity of effluent is required, both stages have to be complete a long period of treatment of the sewage and sludge is necessary; whereas if only clarification is required about two hours' contact of sludge and sewage will accomplish this effect with suitable sludge.

By this process, carried out in two or multiple stages as described, the clotting out or clarification and the oxidation of organic matters, much of the carbonaceous or organic matters are removed, and the absence of these matters is advantageous, and the other stages consisting of the slow conversion of ammonium compounds to nitrite and nitrate, are in consequence accelerated. In the first stage, for the clotting and absorption of the colloidal matters, it is unnecessary to have a highly active sludge; but in the second stage it is necessary to have a highly active sludge to carry out rapid oxidation of the nitrogenous compounds; and in this method or manner of carrying out the process as specified in connection with Figure 1 the sludges employed in the two stages are kept entirely isolated from one another, hence the sludge employed in the second stage in connection with the conversion of ammonium compounds to nitrite, does not contain any considerable quantity of pollute or inhibitive matters, and the consequent acceleration of this latter stage produces a great saving both in tank capacity and horse power for aeration.

Referring now to Figures 2 and 3, in these figures is shown a settling tank of common general form or construction, namely, a tank having tapered sides, a central intake of liquid to be "settled", and an upper channel for carrying off the effluent; and by means of the tank constructed and adapted to act as described, the objects and effects specified hereafter in connection with it, are accomplished.

The tapered parts of the walls are designated 30, and the vertical portions 31; 32 is the central liquid inlet, and 33 are the effluent outlets, secured vertically on the pipes 34.

The sludge discharge conduit 35 is in one of the walls 30, and leads up from the apex of the cone into a chamber 36 in which is a vertical discharge pipe 37, capable of vertical adjustment by screwing it up and down in a socket device 38; and 39 is the conduit by which the separated sludge is carried away from the tank; while the effluent from the pipes 34 is delivered by a vertical part 40 within a trough 41, having an opening in a wall controlled by a valve or penstock 42, for varying or regulating the size of opening or orifice for the discharge of effluent into the conduit 43.

The tank is provided on the inside of the walls 31, with a trough 45 formed by a wall 46 built on to the wall 31 and forming a weir; and the level of the lip of the weir is above the normal level of the liquid in the tank.

By the construction of this tank grease or floating matter can be removed from the liquid in the tank, so that the sludge used in the process shall contain as little grease as possible; and in operation, if the valve 42 is closed more or less, so as to restrict the discharge of liquid from the tank, it will rise in the tank to above the level of the weir 46, and therefore the floating grease and matter will flow of itself into the troughs 45, or it can be easily swept into them. When the head of liquid in the tank is thus raised, it will also cause the conduits 35 and others to be flushed, i. e. by closing the valve 42, or by opening other pipes, the pipes and channels connected with the tank can be flushed and so cleansed.

The grease which enters the troughs 45, can pass away through a valved outlet 47, which can be closed if desired when it is required to flush the discharge conduits, such as the sludge conduits 35 and pipes 34.

The flushing of the sludge conduits may be caused to take place at the same time as the removal of grease, which is advantageous.

As a modified mode of removing the grease from the liquid in the settling tanks, one of the mouths or shields 33 on the pipes 34 can be removed or lowered, and the pipe 34 extended through the walls of the tank, the extensions having a valve on them as shown in dotted lines, so that when one of the valves is opened and one of the mouths or shields 33 is removed or lowered, the grease on the liquid in the tank will flow away through the pipes and be delivered into a suitable receptacle or discharge conduit. The grease will collect generally in one corner or along one side of the tank, owing to the force of the wind, and thus it will be only necessary to remove or lower one of the mouths or shields, or at most two, namely, that or those round which the grease is collected. Hence, according to this modification, it will not be necessary to raise the level of the liquid in tank when drawing off grease.

Thus by the construction and manner of operating the tank shown in Figures 2 and 3, the three liquids, sludge, grease, and the effluent are separated, and pass away from it separately.

Also by this apparatus shown in Figures 2 and 3, the return of sludge to the treatings tanks may be rendered proportional to the volume of flow of sewage at any moment, which is important and advantageous, and by it daily or seasonal changes, such as those due to varying temperatures or seasonal changes, and to the character and strength of the pollute, or changes due to flushes or trade waste, can be met.

In some cases, the removal of grease or floating matter may take place in the preliminary tank described hereafter in connection with Figure 4.

Figure 4 shows a plant in which the two stage process is modified in the respect that the sludges used in the different parts or stages of the process are not wholly or at all times kept separate, as in the former case described in connection with Figure 1.

In this case, the sludge from the settling tank is conveyed into the chamber 12A by an air lift 13; and without being passed through the re-conditioning tank 2, it can pass into the conduit 4 through which the sewage to be treated is passing to the treating tanks 1, and so mixes with it, and in passing through the air treating tanks 1, this portion of the sludge supplied to the incoming sewage will act upon it say to the point at the opposite end of the tank where some sludge from the reconditioning tank 2 is admitted to it, or if the upper portion of the tank is employed for impounding liquid as herein described, then the valves 50 of the cross walls 51 can be shut, and re-activated sludge passed through a valve 52, in which case communication between this first portion of the tanks 1 on the supply side of the transverse partition 51 will pass into the second portion of the tank through a valve 53 working in an aperture at that point.

Any surplus sludge may be taken away from the plant and supplied to the tank 55 from the chambers into which the sludge from the settling tank is delivered.

Thus, in this case when a part of the sludge from the settling tanks is passed into the sewage inlet conduit 4, and a part into the re-conditioning tank 2, a part only of the returned sludge is re-conditioned.

In this Figure 4, there is shown in connection with it, a tank in which sewage—say after being screened, and grit and free solids removed from it—is passed through a preliminary treating tank and aerated in it in any of the manners specified with or without the addition of surplus sludge; and it is also there prior to being introduced into the treating tanks proper, settled by passing through a settling tank, and the effluent from it is then conducted into the treating tank proper by way of the conduit 4. This preliminary additional treatment to that which it receives in the main treating tanks is valuable and advantageous where sewage normally or occasionally arrives at the plant in a septic state, in that the gases resulting from this condition are removed, and the septic conditions are arrested, and also the liquid is generally brought to a condition, that the subsequent operations upon it which take place in the treating portion proper of the plant, by which it is purified rendered easier, more effective and the period of treatment, shorter.

In the arrangement shown in this Figure 4, the sewage enters the preliminary treating tank 60 by way of a small tank 59, from which it is distributed into the tank 60, which in the case shown is divided into three runs or sections; and at the opposite end of the tank there is a settling tank 61, similar to the tanks above described, into which the liquid from the tank 60 passes, and in which the sludge or undissolved matters are separated, and the effluent from it passes by the conduit 62 into the conduit 4; the sludge separated in this tank 61 passing away by the pipe 63. Thus it is only a cleansed liquid that enters the treating tanks 1.

In some cases, as in the case shown in Figure 4, the surplus sludge which is led into the tank 55, can be introduced into the sewage supplied to the tank 60; and this can be effected by way of branch pipe 64, on which is a controlling valve 65; and when such sludge is mixed with the sewage, it together with the other sludges separated in the tank 61, will be carried off. Alternatively, instead of this sludge being carried to the tank 60, some of it may pass through a valved opening 66 in the wall of a conduit 67, communicating with the treating tanks 1.

Thus by this preliminary treatment by air (preferably by air forced through it) of the sewage on its way to the clarifying and biological portions of the treating plant, the septic condition of the sewage, if it arrives at the plant in this condition, is stopped, and polluting matter, if not already dissolved and required to be broken up, is disintegrated, and its condition is bettered for being worked upon by the aerobic bacteria subsequently; and it also promotes the demulsification of the grease, and sets it free.

If surplus sludge is not available for use in the preliminary treatment, aeration of the sewage may take place without any sludge being added to the sewage.

The settling tank 61 shown in Figure 4 may be adapted to extract grease similarly as described with reference to Figures 2 and 3.

As a modification of the preliminary treatment described, instead of removing the sludge from the settling tank 61 continuously, it may be deposited on the bottom of any suitable tank and dug out intermittently after the water has been run off from above it; but the effluent in any case will be drawn off continuously, except at such times as the sludge is being dug out and removed.

When surplus activated sludge from the subsequent stages of the process is used as described, it helps to precipitate light matters held in suspension in the sewage, and the pretreated effluent from the settling tank 61 is partly purified, with the effect above described in the subsequent actions.

As above described, while the invention is especially applicable for the treatment of strong sewage, or sewage of average strength, it can also be used in connection with normally weak or dilute sewage; and in such a case a part only of the sludge coming from the settling tanks 3 need be reconditioned, the other part being admitted directly from the settling tanks to the sewage delivered to the treating tanks 1, such as described in connection with Figure 4.

In the case where a preliminary treatment such as just described in connection with the tanks 60, 61, is used in connection with the system employed in treating sewage in the manner set forth with reference to Figure 1, wherein the purification is carried out in two distinct successive stages complete in themselves, the period of purification in such a case will be still further shortened, and the quantity of power employed in working the plant for compressing or blowing air, or agitating the sewage for its aeration, is reduced, and in consequence the actual size and cost of the complete plant is correspondingly reduced.

A modification of the method of carrying out treatment of sewage in stages as specified in connection with Figure 4, is illustrated in Figure 5, and this is more advantageous in the treatment of the stronger characters of sewage.

Generally, the description of the manner of carrying out the process described with reference to Figure 4 in the two or multiple stages, can apply to the manner of carrying out the invention illustrated by this Figure 5, but in this case in addition to the employment of re-conditioned activated sludge, some of the sludge which is being re-conditioned in the re-conditioning tank (which can be relatively large so that the re-conditioning can be carried to a high degree) is passed into another tank $2^x$, in which a special bacterial cultivation of a kind required is carried on, and wherein the bacteria are aerated. This part of the sludge after being aerated is delivered at the outer end of its tank $2^x$, into the main treating or purifying tank 1, and into the later portion of these tanks, in which the ammonium compounds are being converted to nitrite and nitrate (or at any point where desired) or can be delivered back again into conditioning tanks 2; whilst the other portion of the re-conditioned sludge can be delivered to the tanks 1 at or near the point of supply of sewage (or effluent from a preliminary treating tank) at a point or points between the inlet of sewage, and the end of same similarly as in the case described with reference to Figure 4, and as indicated by the arrows; whilst the final effluent passes away by a conduit 23 into the settling tank 3, the separated sludge from which gravitates to the chamber 32, from which it is lifted by the air lift 13, whence it is distributed to the tanks 1 and 2.

Figure 6 is a plan showing another modification, wherein special cultivation of bacteria is adapted to be produced, and it is required to treat strong sewage, and purify it only partially but quickly; and the final effluent can be discharged into an estuary or on to filter beds.

In this plant shown in Figure 6, $2^x$ is the special cultivation tank and 2 is the sludge re-conditioning or reactivating tank or part of the plant; and 72 is a tank or plant in which the re-conditioned sludge or some of it is inoculated with some of the special cultivation from tank $2^x$.

In this case, the sewage, which may be assumed to be screened and free from grit is passed by a supply pipe 58 into a tank 59, and thence by a conduit into one of the tanks or lengths of the aeration tanks 1 of the plant; whilst the returned sludge from the settling tanks 3, into which the treated liquid from the tanks 1 flows, is passed by a conduit 35 into the conduit 10, and thence into the re-aeration or re-conditioning tanks 2; and after passing through these tanks, which are of relatively large capacity or area, the sludge is subjected to prolonged aeration, a portion of it passes by a channel $57^x$ into the chamber 59 to mix with the incoming sewage, whilst the other portion—which may be the smaller portion—will pass into the sludge inoculation tank portion 72, to which some of the sludge from the special cultivation tank $2^x$ is being introduced, as indicated by the arrows; and the sludge so inoculated will pass into the later portion of the treating portion 1 of the plant. Thus, according to this method of treating and purifying sewage, the sewage will have supplied to it ordinary re-conditioned sludge at the commencement of its aerating treatment, and throughout; whilst at the later stage, it is furnished with the reconditioned sludge inoculated by or supplemented with the special cultivation sludge from tank $2^x$, in which sludge is aerated as in other sludge tanks. After treatment, the treated sewage or liquid passes by the conduit 23 to the settling tank or tanks 3.

By this latter system of preparing the sludge, a sludge of very high activity or power is produced.

It will be noted that in the systems illustrated in Figures 1, 4, 5 and 6, the drawings are merely diagrammatic, and it is therefore to be understood the areas or sizes of the different tanks or parts are not to be taken as being of working proportions. The relative areas or sizes of the different parts will necessarily vary according to the quantities of sewage to be treated, the character of the sewage as affected by trades waste, the degree of purity required, and other conditions of application.

Regarding the method of dealing with the sewage coming down to the plant containing an excess of pollute or organic matters or trade wastes, and the impounding for a time of the sewage or sewage and sludge, this may be effected in a part of the tanks which are normally used as aeration tanks, or in special tanks.

An illustration of this system is shown in dotted lines in connection with the plant shown in Figure 1.

In this plant in the first stage portion are transverse walls 74, having openings 75 provided with valves, which when not impounding liquid are open, but which when impounding liquid are closed, and the part of the sewage of this character coming down, will be delivered into say the upper portion of the tanks 1, 2, and enclosed and impounded therein for a period of time; and then when the strength of flow of the sewage is below the average strength and flow, the impounded mixed liquor in the impounding portions (which should be aerated while in them) is passed into the other portions of the tanks and treated with the rest of the sewage and sludge passing continuously through same.

In some cases the passing of the impounded liquor in these impounding portions, into the other or treating portions may be effected by the delivery into them of surplus sludge coming from the plant; and in the case shown in Figure 1, this surplus sludge is taken from the second stage tanks by the pipe 76 and delivered by a pipe 77 to delivery branches 78, having valves 79 on them, which control the discharge of the sludge into the various sections of the tanks.

Similar pipes and branches as just described may be used in connection with the other portion of this first stage tank, if desired, as indicated by the dotted lines to get rid of the surplus sludge from the second stage into the first stage. When all the impounded liquid in the outer ends of the tanks has been expelled, the surplus sludge could then enter the inner ends of the tanks, as indicated by the dotted lines.

When the impounding tank portions are full of surplus sludge, the flow will be stopped, and the sludge so impounded may be stored until another flush of strong or inhibitive sewage calls for prolonged treatment. This strong sewage to be impounded, with its activated sludge, will then eject the stored and fully activated sludge into the system, until the flush of strong sewage is impounded.

In this way, the activated sludge which has been debilitated by contact with strong sewage will be replaced in the system by a highly activated sludge, which if desired may be inoculated with the special sludge cultivation herein described.

As a modification of carrying out the impounding method, the discharge or delivery of the impounded liquid from its holding tank into the treating portions of the plant may be effected by the inflow of fresh sewage, or by pumping of the final clarified effluent of the process from the settling tanks 3 into the holding tanks or channels containing the impounded liquor, so as to force it out of same into the treating tanks; and, furthermore, in the latter case, this effluent may be mixed with the liquid impounded in such a manner as to dilute it to any required degree.

In some cases the impounding may take place in the daytime when strong sewage is more likely to come down to the plant; and it may be held up until night time, when generally, sewage arriving at the plant is relatively weak; and in this case the strong sewage can be arranged to flow through all the tanks; and then for treating the weak sewage one or a portion of the tanks can be made to serve as purifying tanks for weak sewage, the other or others being meanwhile cut out and used for the impounding sewage or sludge.

With regard to the production or proportion of the highly active or specially prepared sludge, it should be rendered as free of unoxidized organic matter as possible, and in this condition it will serve as a basis or nidus for the cultivation and presence of active nitrifying or other organisms, and this special character of sludge may be produced in the part of the reconditioning tanks or channels, or a special tank for the purpose.

As above stated, in connection with Figure 1, when desired, this multi-stage treating plant is arranged and adapted to be worked according to a single stage method; and in some cases it will be so used in wet weather, when the volume of sewage is relatively large and thus comparatively weak; whereas in dry weather when the sewage is comparatively strong the plant will usually be used and operated according to the multi stage method.

Another modification when two independent stages as in Figure 1 are adopted, the first stage may consist of tanks as shown in Figure 6, and the second stage of tanks as shown in Figures 4 or 5.

Under this invention therefore, the activated sludge process is split up into two or more stages, that is into its component parts, and the clarification or clotting out stage or part, from the final oxidizing stages; and as the clarifying or clotting out action of the first stage for getting rid of the grosser or readily oxidizable matters is easily and effectively done, it is not necessary in this stage to use a highly cultivated nitrifying sludge to absorb the colloidal matter, this action being effected within the first two hours of treatment or less with a suitable sludge, while the oxidization of the second stage, will take a much longer time, in some cases up to 24 hours, but the action of the conversion of the ammonium compounds to nitrite and nitrate which takes place in this stage, is expedited or accelerated by the absence of undue quantities of organic matters or pollute which have been removed in the first stage.

In addition, the sludge used in this stage may contain specially cultivated nitrifying and/or other organisms which will accelerate the rate of purification or oxidation even further.

As regards the preliminary air treatment described, if this is done without the addition of sludge, and the treated liquid is settled, and the sludge removed or deposited by sedimentation, this sludge can be dealt with by drying, or by digestion followed by drying; and in addition to this, septicity is arrested in the sewage, and grease can be removed; while the gases resulting from fermentation of the sewage, are dispersed. And in addition to this, the strength of the sewage is reduced, and a further effect is, that the work to be done in the process tanks is reduced, resulting in a saving in tank capacity, and horse power necessary to carry on the process.

The preliminary treating tank itself may be of large capacity, say from $\frac{1}{10}$th to $\frac{1}{3}$rd of that of the treating tanks, and to the flushes of trade waste which it receives during daily peak flow, it acts as an intercepting buffer to them, and the main purifying plant.

What I claim is:

1. A sewage treatment process comprising treating sewage with activated sludge, separating the resulting sludge and effluent, treating the effluent with an activated sludge high in nitrifying bacteria, separating the effluent from the sludge in the second treatment, returning a part of the latter sludge to the sewage in the first treatment, and using the rest of said latter sludge to supply said activated sludge high in nitrifying bacteria.

2. In sewage treatment apparatus, a preliminary tank for aerating incoming sewage to de-grease it and stop septic action, a settling tank, an aerating tank for oxidizing and clotting organic matter, a second settling tank, conduits connecting said tanks in the order named, means for returning activated sludge from the second settling tank to the conduit from the first settling tank to the aerating tank, a sludge reconditioning tank and conduits connecting said reconditioning tank with said second settling tank and said oxidizing tank, whereby reconditioned sludge may be admitted during the aerating process.

3. In sewage treatment apparatus an aerating tank, a sludge reconditioning tank, a surplus sludge tank, a settling tank, means for connecting conduits whereby activated sludge may be conducted from the settling tank to the aerating tank, reconditioning tank or surplus tank, and conduits whereby sludge from the reconditioning tank and surplus tank may be admitted into said aerating tank.

4. Sewage treating apparatus comprising a preliminary aerating tank, a preliminary settling tank, an aerating tank, a settling tank, conduits connecting said tanks in the order named, a surplus tank, a conduit from said settling tank to said surplus tank, and conduits from said surplus tank to said preliminary aerating tank and to said aerating tank respectively.

In testimony whereof I have signed my name to this specification.

JAMES ALGER COOMBS.